US008505408B2

(12) United States Patent
Havlicek (10) Patent No.: US 8,505,408 B2
(45) Date of Patent: Aug. 13, 2013

(54) ADJUSTABLE STEERING COLUMN ASSEMBLY

(75) Inventor: Jan Havlicek, Zdar nad Sazavou (CZ)

(73) Assignee: TRW Das A.S., Dacice (CZ)

( * ) Notice: Subject to any disclaimer, the term of this patent is extended or adjusted under 35 U.S.C. 154(b) by 0 days.

(21) Appl. No.: 12/744,781

(22) PCT Filed: Nov. 28, 2008

(86) PCT No.: PCT/EP2008/066435
§ 371 (c)(1),
(2), (4) Date: Nov. 11, 2010

(87) PCT Pub. No.: WO2009/068646
PCT Pub. Date: Jun. 4, 2009

(65) Prior Publication Data
US 2011/0041642 A1  Feb. 24, 2011

(30) Foreign Application Priority Data
Nov. 30, 2007 (GB) .................................. 0723485.9

(51) Int. Cl.
*B62D 1/16* (2006.01)
(52) U.S. Cl.
USPC ............................................. 74/493; 280/775
(58) Field of Classification Search
USPC .......................... 74/492, 493; 280/775, 777
See application file for complete search history.

(56) References Cited

U.S. PATENT DOCUMENTS

| 5,029,489 | A | * | 7/1991 | Burmeister et al. ............. 74/493 |
| 6,139,057 | A | * | 10/2000 | Olgren et al. .................. 280/775 |
| 7,325,467 | B2 | | 2/2008 | Breuss et al. |
| 7,752,940 | B2 | * | 7/2010 | Lutz .................................. 74/493 |
| 7,861,615 | B2 | * | 1/2011 | Harris et al. ..................... 74/493 |
| 2004/0261565 | A1 | * | 12/2004 | Uphaus et al. .................... 74/493 |
| 2005/0016315 | A1 | * | 1/2005 | Breuss et al. .................... 74/493 |
| 2006/0273568 | A1 | * | 12/2006 | Manwaring et al. ........... 280/777 |
| 2007/0204714 | A1 | * | 9/2007 | Lutz .................................. 74/493 |
| 2008/0231030 | A1 | * | 9/2008 | Menjak et al. ................. 280/775 |
| 2009/0013817 | A1 | * | 1/2009 | Schnitzer et al. ................ 74/493 |
| 2009/0044656 | A1 | * | 2/2009 | Okada et al. .................... 74/493 |
| 2010/0275721 | A1 | * | 11/2010 | Davies et al. ................... 74/493 |

FOREIGN PATENT DOCUMENTS

| DE | 10130587 A1 | 1/2002 |
| DE | 10212263 A1 | 10/2003 |
| EP | 1500570 A2 | 1/2005 |

OTHER PUBLICATIONS

International Search Report for PCT/EP2008/066435 dated Feb. 26, 2009.

\* cited by examiner

*Primary Examiner* — Troy Chambers
*Assistant Examiner* — Valentin Craciun
(74) *Attorney, Agent, or Firm* — MacMillan, Sobanski & Todd, LLC (57) ABSTRACT

An adjustable steering column assembly includes a fixed rack secured to a first portion and a moving rack secured to a second portion, which are releasably engaged by a clamp mechanism to permit relative movement therebetween. The fixed rack comprises two rows of teeth spaced apart from one another and extending towards. The moving rack also comprises two rows of teeth which extend away from each other. A clamp engaging means moves the moving rack into and out of engagement with the fixed rack. The teeth on the two racks are offset relative to one another. The mechanism is further arranged so that when if a tooth on tooth event occurs the fixed rack interacts with the moving rack to cause the moving rack to move sideways to permit the teeth to become inter-engaged when the mechanism finally reaches the locked position.

17 Claims, 7 Drawing Sheets

ADJUSTABLE STEERING COLUMN ASSEMBLY

CROSS-REFERENCE TO RELATED APPLICATIONS

This application is a national stage of International Application No. PCT/EP2008/066435 filed Nov. 28, 2008, the disclosures of which are incorporated herein by reference in entirety, and which claimed priority to Great Britain Patent Application No. 0723485.9 filed Nov. 30, 2007, the disclosures of which are incorporated herein by reference in entirety.

BACKGROUND OF THE INVENTION

The invention relates to adjustable steering column assemblies of the kind that use rows of inter-engaging teeth for the purpose of positively locking the steering wheel at various up/down (rake) and/or in/out (reach) positions.

Steering column assemblies are known which include a clamp mechanism that relies solely on friction when locked to prevent unwanted movement of the column assembly. The clamp mechanism can be unlocked and locked by movement of a locking lever or, sometimes, electrically using a motor or perhaps hydraulically or pneumatically. These columns can typically resist radial and/or axial forces of 600N applied at the steering wheel before slipping.

However, it is increasingly a requirement from car manufacturers that there should be no substantial movement of the steering column assembly when forces of up to 6000N are applied. The objective is to prevent unwanted movements of the steering wheel in a crash so that the deployment of the air bag is ideally controlled.

For this, friction alone is often insufficient, as massive clamp forces would be needed to achieve this. Some method of Positive Locking is needed. Typically this involves the use of inter-engaging teeth.

There is a well known problem with the type of "Positive-Locking" column which uses rows of inter-engaging teeth whereby, prior to operation of the locking lever by the driver, the selected steering wheel position has resulted in exact alignment of the tips of one row of teeth with those of the set of teeth with which they are supposed to engage. Inter-engaging of the teeth during the clamping operation is thereby blocked and, if excessive force is applied by the driver to the clamp lever to force it to complete its travel, permanent damage can occur to the tips of the teeth. At the very least, such a Tooth-on-Tooth occurrence will require the driver to consciously re-release the lever, find a slightly different wheel position and then re-engage the lever. Unless special means are provided to overcome this problem, then it is likely to occur during 10% to 20% of all adjustment operations. This is undesirable.

BRIEF SUMMARY OF THE INVENTION

It is a feature of the present invention is to provide a steering column assembly including a clamp mechanism that at least partially ameliorates this tooth-on-tooth problem.

Accordingly, the invention provides an adjustable steering column assembly which includes a first portion, a second portion and a clamp mechanism that comprises a fixed rack secured to the first portion and a moving rack secured to the second portion, the first and second portions being releasably engaged by the clamp mechanism to selectively permit an amount of relative movement between the first and second portions that is required during reach and/or rake adjustment of the steering column assembly, in which:

the fixed rack comprises two rows of teeth which are arranged spaced apart from one another with the teeth extending towards each other, the moving rack comprises two rows of teeth which extend away from each other in opposite directions and are spaced apart from each other by an amount less than the spacing between the two rows of teeth of the first rack;

and in which the clamp mechanism further comprises a clamp engaging means which is operable to move the moving rack into and out of engagement with the fixed rack such that:

in a disengaged position of the clamp mechanism the rows of teeth on the moving rack are held clear of the rows of teeth of the fixed rack, and in an engaged position one row of teeth of the moving rack is interlocked with a row of teeth of the fixed rack, such interlocking in the engaged position being assured by arranging that the teeth on the fixed rack and the moving rack are aligned relative to one another such that in the event that the end faces of the teeth of one of the rows on the fixed rack are aligned in a tooth on tooth position with the end faces of the teeth of one of the rows of the moving rack, the teeth of the other row on the fixed rack will not be aligned in a tooth on tooth position with the teeth of the other row on the moving rack and further by the mechanism being so constructed and arranged that when this tooth on tooth event occurs on moving from the disengaged to the engaged position then during continued movement the fixed rack interacts with the moving rack to cause the moving rack to move across in the direction of the rows of teeth that are not in a tooth on tooth position thereby to cause those rows of teeth to become inter-engaged when the mechanism finally reaches the locked position.

Because there is always one pair of rows of teeth that are not in a tooth on tooth position during locking, and the moving rack is caused to move to permit that pair of rows to engage, then positive locking is always assured.

Furthermore because the tips of the teeth of each row extend in a plane that is parallel to the tips of the teeth of the other rows it is ensured that in the event of a crash—which would tend to cause the fixed and moving racks to try to move parallel to one another in a direction along which the rows of teeth extend—there is no component of the force in the direction of unlocking movement of the moving rack. If this was present it would be highly undesirable as the crash load would attempt to stretch the clamp pin resulting in potential failure. At the very least this unwanted force would necessitate a beefed up support bracket against which the force could be reacted, which is again undesirable.

The teeth may therefore all extend in a direction parallel to the general direction of movement of the moving rack generated by the clamping mechanism as it moves from unlocked to locked. In one arrangement, for example, the clamping mechanism may include a clamp bolt along which the moving rack may slide or otherwise be guided parallel to the bolt axis and the teeth tips should then be arranged in a direction parallel to the bolt axis.

Most preferably, each of the fixed rows of teeth lie in a common plane, and the moving rows of teeth also lie in a common plane, the planes being parallel to one another and the planes also being coincident when clamping mechanism is in the engaged position. The movement of the moving rack from side to side may be along an axis which lies within the plane that contains the two moving rows of teeth.

The assembly may be arranged such that for all positions of the first and second portions, positive locking can be attained. One way of ensuring this is for by arranging for the teeth of the rows of teeth to all have the same pitch (the spacing from the tip of one tooth to the tip of an adjacent tooth. They may all have the same tooth height (measured from the throat to tip) so that they can be fully engaged.

As mentioned, a feature of the invention is that the teeth of the four rows may be arranged so that when the teeth of one pair of rows (one on the fixed rack and one on the moving rack) are aligned in a tooth on tooth position, the teeth of the remaining pair are not aligned in a tooth on tooth position. This can be achieved by ensuring that the teeth of at least one of the rows are offset axially (along a direction parallel to the long axis of the rows) from the teeth of the other rows. By offset, we mean that if the rows of teeth were all translated laterally within their plane in a direction orthogonal to their long axis such that they overlaid each other, the tips of the teeth of the one row would be offset from the tips of the teeth of the other rows.

Preferably, the teeth of the one row are offset by half of the pitch between the teeth of that row. Other offsets and tooth pitches could also be used, as long as the end faces of the teeth of one pair of rows do not partially or wholly line up for any position of the moving rack in which the end faces of the teeth of the other pair of rows do partially or wholly line up.

At least two ramps may be provided on the fixed rack, each one associated with a respective one row of teeth of the fixed rack, and at least two complimentary ramps are provided on the moving rack, each one associated with a respective one row of the teeth of the moving rack such that in the event that a tooth on tooth event occurs one ramp on the fixed rack co-operates with one ramp on the moving rack whereby the action of the ramps sliding over one another on movement towards the locked position causes the movement of the moving rack across in the direction of the rows of teeth that are not in tooth on tooth.

The end faces of the teeth of the fixed rack and/or the moving rack may be chamfered or bevelled to define complimentary ramps. The ramps formed by the ends of one of the two rows of teeth whose tips face each other may slope such that a line extended from the root of the tooth and onwards past the tips will intersect a corresponding line from the ramp of that other facing row of teeth. The ramps of the other two rows of teeth that face away may slope in the opposite direction such that a line extended from the tip of the tooth and onwards past the roots will intersect a corresponding line from the ramp of that other row of teeth.

In one arrangement, the ramps may be shaped such that the teeth are wider at their root than at their tips. The ramps ensure that in the event that the sides of teeth of the moving rack strike the sides of the teeth of the fixed rack. Any locking force which is applied will therefore be partially converted into the sideways force needed to move the moving rack to the side. This sideways movement causes it to move in a direction towards the other fixed rack of teeth which is not in a tooth on tooth condition.

Of course, it need not be direct contact between the bevelled, ramped, end faces of the teeth that causes the sideways movement of the moving rack. The fixed and moving racks may be provided with protrusions which strike one another when the teeth are, or would otherwise be, in a tooth on tooth position. These protrusions, rather than the teeth themselves, then generate the sideways force. The protrusions could be considered to be guides for the moving rack.

The spacing between the two rows of teeth on the moving rack is preferably such that when the teeth of the first pair are fully engaged with the fixed teeth of the first pair, the teeth of the second pair are fully disengaged and when the teeth of the second pair are fully engaged with the fixed teeth of the second pair, the teeth of the first pair are fully disengaged.

The spacing is most preferably such that when the tips of the teeth of one fixed/moving row pair are in contact the teeth of the remaining fixed/moving row pair are fully engaged. This can be achieved by making the spacing between the rows of fixed teeth greater than the spacing between the rows of the moving teeth by at least the height of a tooth (measured as the height of the tip of a tooth above the base of the trough between adjacent teeth).

The moving rack may comprise a clamp block which includes an elongate slot through which a clamp bolt is passed, the clamp bolt also passing through an elongate slot in the fixed rack. The slot in the clamp block may be elongated in a direction 90 degrees from the direction in which the slot in the fixed rack extends. The length of the elongate slot in the clamp block may be selected to correspond to the maximum required side to side movement of the moving portion needed to enable tooth on tooth situation to be avoided. This may be equal to the tooth height where the spacing set out in the immediately preceding paragraph is provided.

The slot in the fixed rack may be at least as long as the required movement of the first and second portions relative to one another in rake and/or reach adjustment.

The slot in the fixed rack may lie between the two fixed rows of teeth on the fixed rack.

Each of the rows of teeth may comprise a linear rack of teeth with 2, 3, 4 or more teeth. However, if required the rows of teeth of the moving rack need not be linear. For example, the two rows of teeth of the moving portion may comprise teeth on opposing sides of a toothed wheel whose diameter determines the spacing between the moving rows.

The teeth may comprise saw shape teeth.

The engagement means may comprise a cam mechanism which may be located on the clamp bolt (where provided), a fixed head on an end of the bolt which provides a reaction face, and a return spring which biases the cam mechanism towards the fixed head.

The fixed rack may be secured to, or form part of a bracket which is fixed relative to a shroud portion of the steering column assembly. The clamp pin, where provided, may comprise a part of or be fixed to a support bracket which is fixed in position relative to the body of the vehicle to which the steering assembly is fitted. As the clamp pin controls the movement of the moving rack, the moving rack may therefore be considered in one sense to be fixed relative to the support bracket.

The bracket of the shroud portion may comprise a reach locking bracket and may include the elongate slot through which the clamp bolt (where provided) passes which is aligned with the teeth of the fixed rack and also aligned with a direction of movement of the shroud portion for reach adjustment.

The support bracket of the moving rack may comprise a rake locking bracket and may include a slot through which the clamp bolt (where provided) passes which is aligned with the direction of movement of the shroud portion for rake adjustment.

In practice, the reach bracket may include a generally horizontal slot, and the rake bracket a generally vertical slot.

Where a clamp bolt is provided, both moving racks may include an elongate slot through which the clamp bolt passes, the elongate slots permitting the required side to side movement of the two moving racks.

The first portion may comprise an upper tubular shroud which may move telescopically relative to a lower tubular portion. The second portion may comprise the lower tubular portion. In this case the clamp assembly locks the upper and lower portions together to control reach adjustment.

In one arrangement, the second portion may comprise the lower tubular portion and a third portion is provided which comprises a support bracket, the clamp mechanism simultaneously clamping the first, second and third portions together.

In this case, the steering assembly may include two fixed racks and two moving racks, both as defined according to the statement of invention. One of the fixed racks and moving racks may provide positive locking of the first and second portions of the steering assembly (for example for rake) and the other fixed rack and moving rack providing positive locking of the first portion to the third portion of the steering assembly (for example for reach).

The teeth on the two moving racks may be arranged at approximately 90 degrees to one another. The teeth of the two fixed racks may also be at 90 degrees to one another to match the respective moving racks. For example, if the direction of movement for reach is horizontal and for rake vertical, the teeth of one fixed/moving rack pair may extend vertically and the other horizontally.

Other advantages of this invention will become apparent to those skilled in the art from the following detailed description of the preferred embodiments, when read in light of the accompanying drawings.

DETAILED DESCRIPTION OF THE INVENTION

Figure 1:
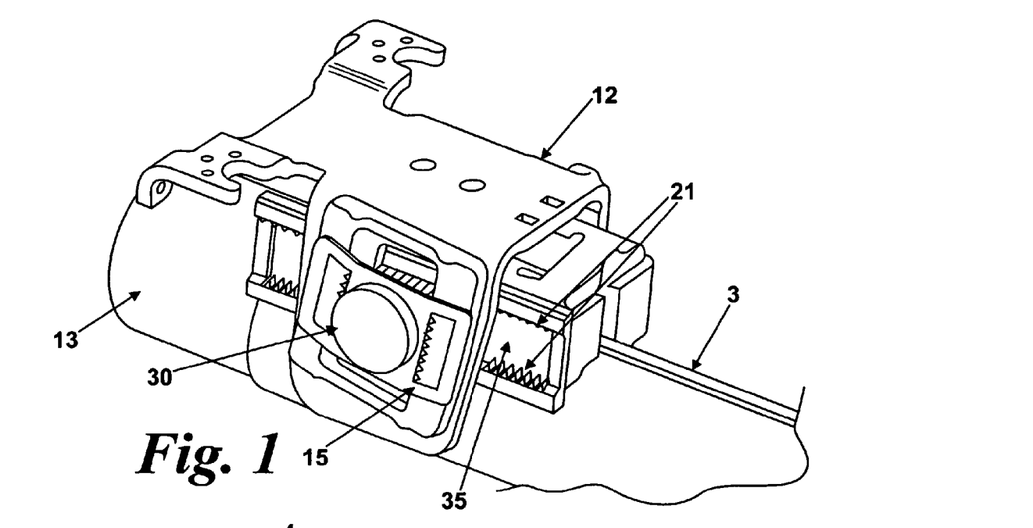
FIG. 1 is an isometric view of a part of an embodiment of a steering assembly in accordance with the present invention.
Figure 2:
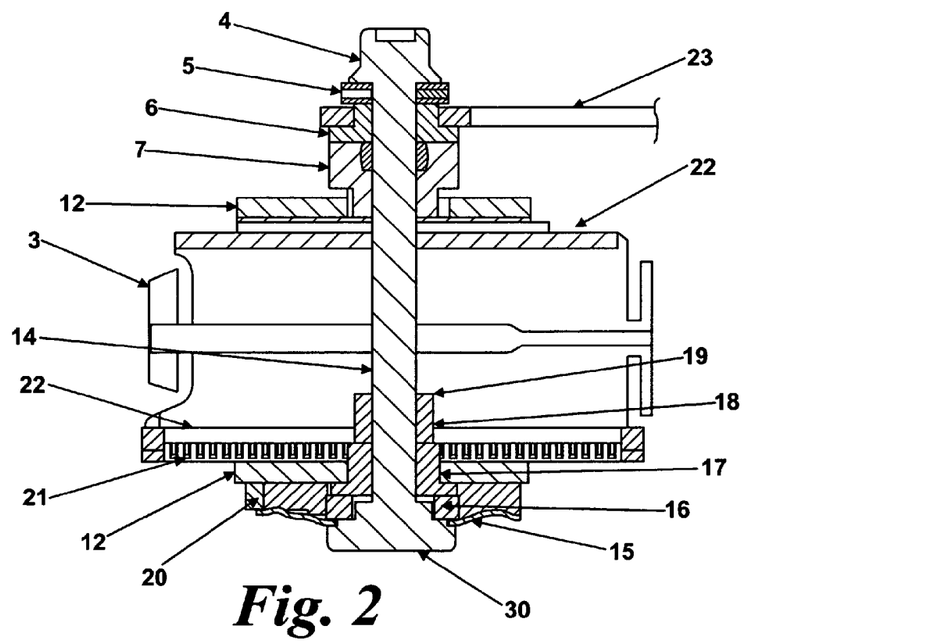
FIG. 2 is a view in cross section looking down onto the part of the steering assembly shown in FIG. 1 from above.

FIGS. 1 and 2 of the accompanying drawings show an embodiment of the invention applied to a so-called double-adjustment type steering column. Such columns can be adjusted for both reach (in and out) and rake angle (up and down). The column assembly comprises an upper column body assembly 3 and a lower column body assembly 13 which can telescope relative to one another to allow for reach adjustment and which can both be moved in an arc around a pivot point axis to allow for rake adjustment. The telescoping mechanism allows the adjustment of the Reach position by the driver and also allows the Outer Shroud to move forward in a controlled manner in the event of the steering wheel (not shown) being impacted by the driver in a crash.

Figure 3:
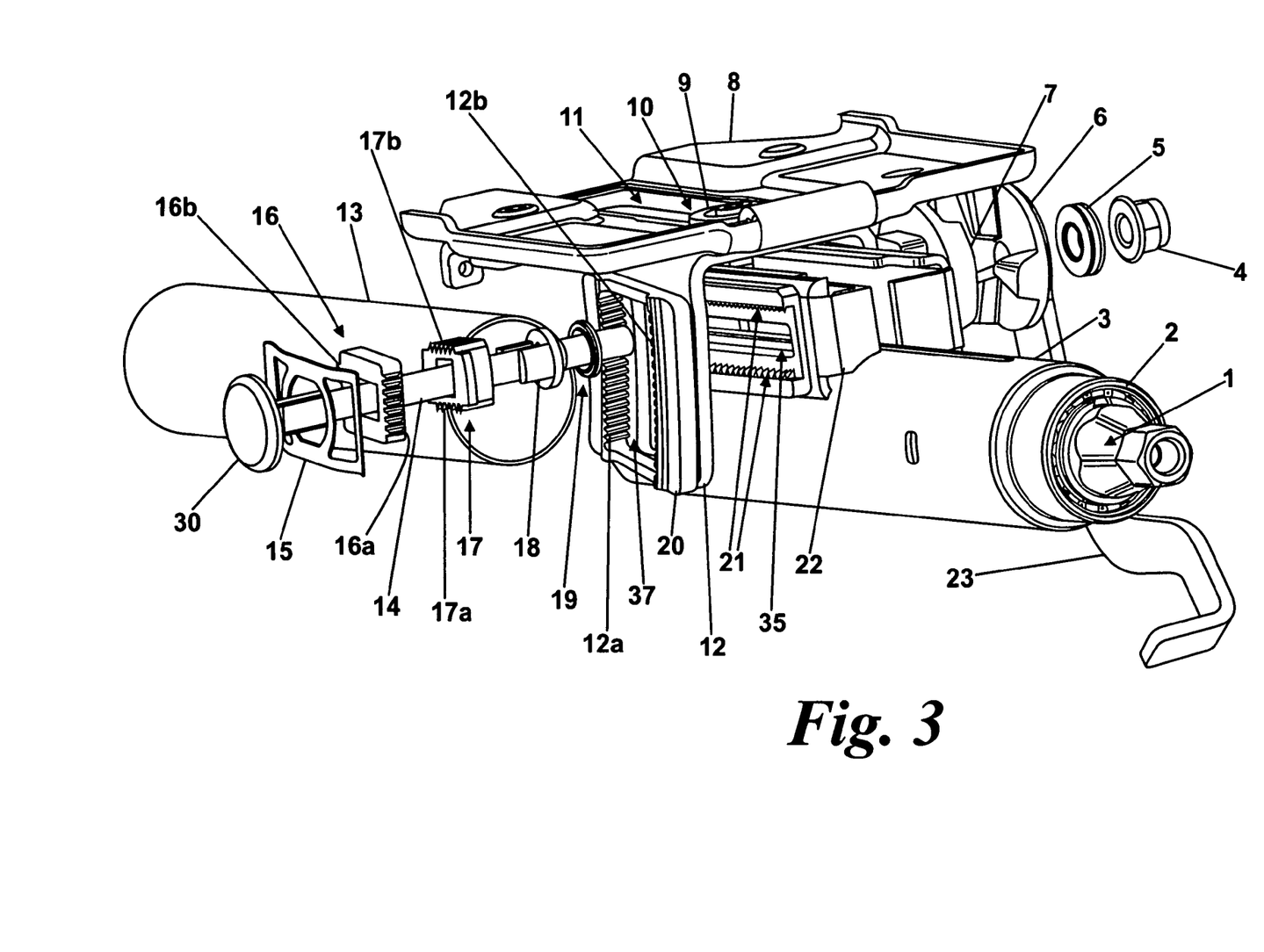
FIG. 3 is an exploded view of the steering assembly which is taken from the same view point as FIG. 1 and shows the component parts of the assembly.
Figure 4:
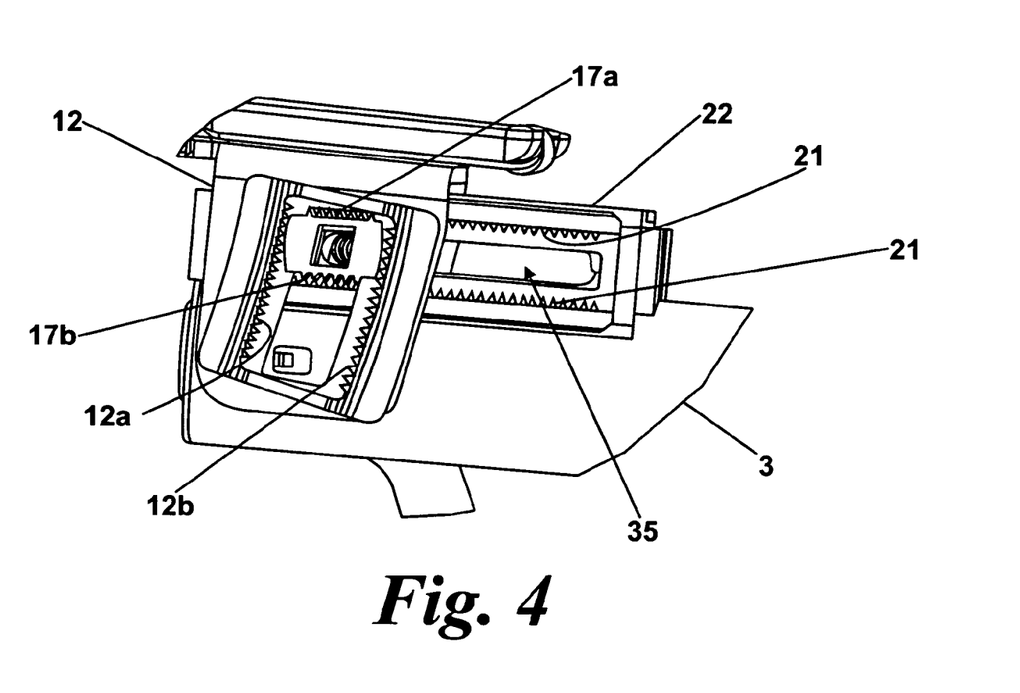
FIG. 4 is a partial cut-away detail of the fixed/moving racks used to lock the assembly for reach.
Figure 5:
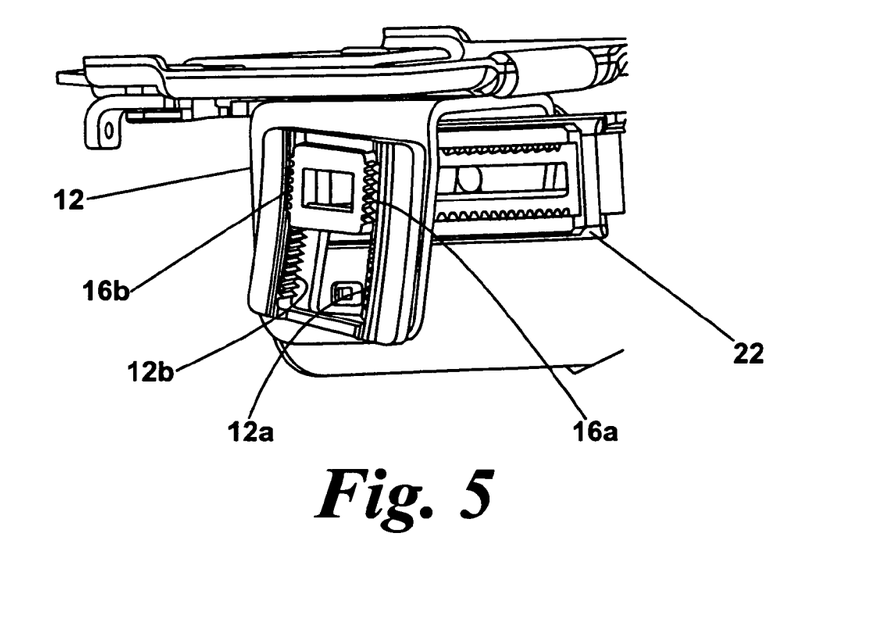
FIG. 5 is a partial cut-away detail of the fixed/moving racks used to lock the assembly for rake.

A first portion, so called upper column body assembly 3, comprises an outer tubular shroud which supports the steering wheel shaft 1 via a ball bearing 2 (see FIG. 3). A second portion, so called lower column body assembly 13, comprises an inner tubular shroud over which the outer shroud is free to slide telescopically. There may be a special bushing (not shown) between the connecting diameters of these Shrouds to minimise the sliding friction.

The upper and lower column shrouds 3, 13 are fixed in position by a releasable clamp mechanism which is operated by a locking lever 23 that can be gripped by a driver. In a disengaged (unlocked, unclamped) position the upper shroud 3 is free to move telescopically along the lower shroud portion 13. When in the fully engaged (locked, clamped) position, the clamp assembly secures the upper shroud portion 3 to a so called rake bracket 12 by a positive locking of inter-engaged teeth so the shroud portions can no longer move telescopically. It is this telescopic sliding action that enables the axial, or "Reach", position of the steering wheel to be varied.

The lower end of the inner shroud portion 13 is pivoted from the vehicle about a transverse axis (called the Rake Pivot axis). Rotation, in a vertical plane, of the assembly comprising both shrouds results in a variation of the steering wheel height or "Rake" setting. Alternatively, it may be fixed to an electric power steering device which itself is pivoted to the vehicle structure at the Rake Pivot Axis.

A third portion, so called rake bracket 12, is provided which is secured to the vehicle. This comprises an inverted U-shaped bracket which has two arms which extend downwards on either side of the shroud in the region where the upper and lower tubular shrouds 1, 2 overlap. This bracket 12 helps to prevent the steering column from moving side to side under load. In the locked position, the clamp assembly locks the upper and lower shroud portions 3, 13 in position between the arms of this bracket to prevent rake being altered.

As can be seen from FIG. 3 of the accompanying drawings, the Rake Bracket 12 is bolted to a Mounting Bracket 8, and then to a part of the vehicle body, by the combination of a Crash Slider Screw 9 and a special Top Hat shaped Washer. The Washer 10 engages with one end of a Slot 11 in the Mounting Bracket 8. In the event of a crash, additional fusible connections, acting between the Mounting Bracket 8 and the Rake Bracket 12, are severed by the impact force of the driver striking the steering wheel. The Rake bracket 12 then slides forwards in the car relative to the Mounting bracket 8. During this sliding process, the steering wheel is maintained in a substantially linear path by the combination of the telescoping of Shrouds 13 and 3 and the guiding action of the Washer 10 sliding in the fixed Slot 11.

The main function of the Positive Locking in the Reach direction is to help control the so-called Crash Force Profile. This is the resistance to forward motion of the steering wheel in a crash. It is usually defined as an initial break-away force followed by a progressive resisting force through the ongoing telescopic travel. In many steering columns, both these characteristics are determined by connection means between the Mounting Bracket 8 and the Rake Bracket 12. For instance, the said fusible connections largely define the initial break-away force while the subsequent resistance to telescoping may be provided in part by a progressively deforming link such as a metal "Energy Strap". The Energy Strap is anchored to the top web of the Rake Bracket while, during a crash, its free portion is drawn over an anvil which is formed in the Mounting Bracket. For the desired Crash Force Profile to be realised via these devices, it is necessary to avoid any relative motion between the Steering Wheel Shaft and the Rake Bracket 12. In other words, the adjustment travel in Reach must be blocked in a crash situation.

The clamping mechanism is designed so that the one lever 23 simultaneously releases or locks the first portion (the upper shroud) to the second and third portions (lower shroud portion and rake bracket) in respect of both the Rake and the Reach directions. The clamping system comprises a clamp bolt 14, which passes through a vertical slot 37 in each arm of the fixed Rake Bracket (which as mentioned previously is attached via the Mounting Bracket to the vehicle structure) and a horizontal slot 35 in each side of a fixed rack portion, in this example a reach bracket 22, which is attached to the Outer Shroud 3. An adjusting nut 4 is provided at one end of the bolt and a cap 30 at the other. Although not essential in all envisaged embodiments, it is also useful to prevent rotation of the clamp bolt 14 in order to set the adjusting nut 4 during manufacture, without the need to temporarily clasp the clamp bolt 14.

A cam mechanism 6, 7 is located on the clamp bolt 14 between the nut 4 and the outer face of one of the arms of the rake bracket 12. The cam mechanism comprises a pair of face-cams, one of which 7 is prevented from rotating while the other 6 is attached to a clamp lever 23. The length of the cam mechanism (along the axis of the bolt) can be adjusted by rotation of the lever 23. The moving cam part 6 of the cam mechanism abuts a thrust bearing 5 which in turn abuts the adjusting nut 4 which is screwed onto the threaded end of the clamp bolt 14. As the cam assembly lengthens when the lever is rotated to a locked position, it applies tension to the clamp bolt, drawing the cap 30 towards the nut 4 and so squeezing the arms of the rake bracket onto the sides of the reach bracket.

Located between the other arm of the bracket (opposite side to the cam mechanism) and the cap 30 of the clamp bolt 14 is a first moving rack in the form of a reach locking clamp block 17. This block 17 is provided with an elongate slotted hole through which the clamp pin passes. It is free to slide along the clamp bolt. The slot is longer than the bolt (which has a square cross section) is wide which allows some vertical movement of the clamp block 17 relative to the clamp bolt 14. The block 17 carries a pair of toothed racks 17a, 17b, arranged in parallel with each other and with each rack having teeth whose tips face outwards away from the teeth of the other rack and away from the clamp pin. In this arrangement, the one of the sides of each of the teeth (not to be confused with the flanks) will face the reach bracket, i.e. face away from the cap 30. The ends of the teeth are bevelled.

The reach bracket 22 is also provided with two rows of teeth 21, one on each side of the elongate slot 35. Each of the rows of teeth extend in line with the axis of the slot, and have teeth whose tips face the tips of the teeth of the other row. In this alignment the end faces (i.e. the faces orthogonal to the flanks and tips of the teeth) will face out towards the clamp block. The spacing between the tips of teeth of these fixed rows is greater than the spacing between tips of the teeth of the moving rows on the clamp block. Note that, although the figures show symmetrical teeth used in each row rather than "saw" teeth shapes, "saw" teeth may be substituted.

In addition to the first moving rack 17 comprising a reach locking clamp block, a second moving rack 16 comprising a rake locking clamp block is also provided. This is similar to the reach locking clamp block in that it has two rows of teeth that face outwards from each other and an elongate slot through which the clamp bolt passes. However, everything is rotated through 90 degrees, so that the rows of teeth are orthogonal to those of the first moving rack. These teeth co-operate with two rows of teeth that are provided on opposite sides of the vertical slot 37 in the rake bracket 12. The rake locking clamp block 16 is located on the clamp bolt between the head 30 and the reach locking clamp block 17.

A release spring 15 is slid on to the clamp bolt 14 so it is partially sandwiched between the cap 30 and the second moving rack 16. This spring 15 acts between the head 30 and the side of the rake bracket 12. The function of the Release Spring 15 is to urge the head 30 of the Clamp Bolt 14 away from the Rake Bracket 12. A star washer 19 fitted to the clamp bolt adjacent the end of the rake locking clamp block furthest from the cap 30 ensures that as the release spring pulls on the cap, the reach and rake locking blocks are pulled away from the reach and rake brackets. The spring 15, rake clamp block 16, and reach clamp block 17 are assembled onto the Clamp Bolt 14 prior to its insertion through the nearer (as shown) sides of the Rake Bracket 12 and the Reach Bracket 22. Items 18 and the star washer 19 are next assembled on to the Clamp Bolt before it is inserted through the far sides of the Rake Bracket 12 and the Reach Bracket 22. Items 18 and star washer 19 therefore finally reside inside the Reach Bracket 22.

FIG. 8 shows the reach locking moving rack 17 in its installed location relative to the Fixed Rack—Reach 21, with items 14, 15, 16 removed for clarity. FIG. 9 shows the rake locking moving rack 16 in its installed location relative to the Fixed Rack—Rake 20, with items 14, 15 removed for clarity.

When the Cam 6 is rotated to the unclamped position, the teeth of the two moving racks are all held clear of the teeth of the fixed racks (secured to the mount bracket and reach bracket). The first portion (upper column shroud 3) can therefore be adjusted for rake (moving the clamp bolt up and down the vertical slot in the rake bracket) and reach (moving the clamp bolt back and forth along the horizontal slot in the reach bracket).

When the Cam 6 is rotated from the unclamped position towards the clamped position, it starts to move away from the Rake Bracket 12 due to its interaction with the profiled face of Fixed Cam 7 and so the head 30 Clamp Bolt 14 is moved towards the Rake Bracket 12. This causes the teeth of the moving Racks (rake block 16 and reach block 17) to start to overlap the teeth of the Fixed Racks 20, 21. Because the bores of the Moving Racks 16, 17, through which the Clamp Bolt passes, are elongated along axes which are normal to their respective toothed edges or tips, any tooth on tooth collision that occurs will be between the end faces of the teeth and due to the shape of the teeth will be self-removed. The assembly will rest in its fully locked position with one of the rows of teeth on the moving racks fully interlocked with one of the rows of teeth of the fixed racks. How this happens is shown in FIG. 6a-d for one of the moving racks and fixed racks. The figures actually show the racks that prevent reach adjustment, but the same operation applies for the rake adjustment, everything simply being rotated through 90 degrees.

Figure 6A:
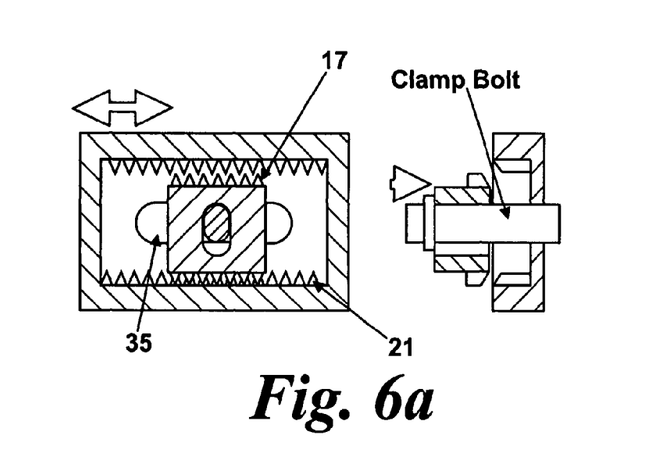
FIGS. 6a to 6d are schematic representations of the relative positions of the fixed and moving racks that control reach adjustment when moving from (a) the unlocked position to (d) a fully locked position.
Figure 6B:
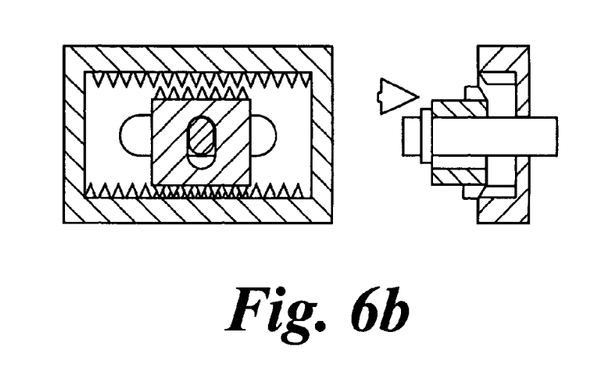
Figure 6C:
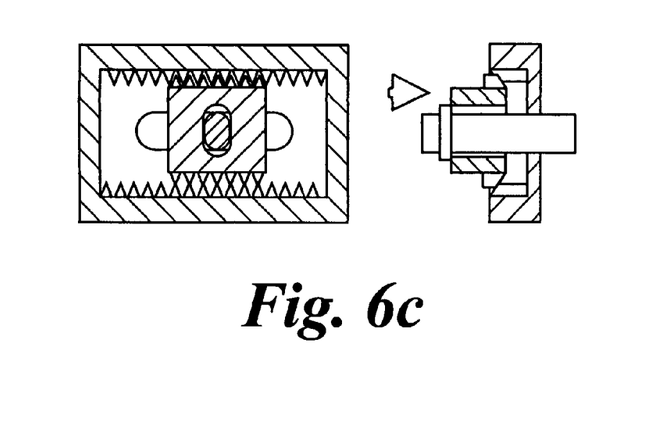

FIGS. 6a, b, c, d show in side view and in transverse cross-sectional view the relative position of the racks of teeth of the reach locking clamp block and reach bracket which enable positive locking to be achieved whilst avoiding the Tooth-on-Tooth problem known from the prior art. The horizontal arrows in the cross-sectional views show the direction in which force will be applied to the Moving Rack to achieve clamping.

Before describing how tooth on tooth is prevented, some special features of the teeth of the rows should first be understood. As can be seen from FIGS. 6a-d the teeth of the upper row on the Fixed Rack are axially offset relative to the teeth of the lower row. The teeth of the moving rack are aligned with one another. This means that, should the tooth tips (sometimes referred to as toplands in the art) of one row of the moving rack be aligned with those of their counterparts on the fixed Rack, then the tooth tips of the other row will not be so aligned. This is important to the operation of the assembly of the invention.

The tips of the teeth of one row on the fixed rack all lie in a plane that is parallel to a plane that contains the tips of the teeth of the other row. By this we mean that the planes do not form a V-shape relationship with one another and do not form an angle. The teeth and tips are therefore parallel to the axis of the clamp bolt.

Additionally, it should be noted that the end faces of the teeth that will come into contact if they overlap are bevelled. This can be seen in FIG. 6. The ends therefore present themselves as ramps with the teeth being narrower at their tips than at their roots. When the teeth of a moving rack are pressed against the teeth of a fixed rack, these ramped end faces cause a sideways force to be applied to the moving rack as a locking force is applied, causing the rack to move in a direction away from the rows of teeth that overlap. The moving rack simply slides down and across the ramped end faces. This tends to remove the overlap of those teeth as will be described.

It should also be noted that the vertical height of the Clamp Bolt 14 is constant in relation to the Fixed Rack due to a sliding interface between these two parts. This interface may take the form of a horizontal slot in the Fixed Rack, as shown. Note also that the objective, in order to positively lock the column, is to prevent horizontal movement of the Fixed Rack relative to the Clamp Bolt.

FIG. 6a shows the Fixed Rack assembly and the Moving Rack assembly in an unclamped condition. In this position the clamp block is held slightly away from the reach bracket compared to the locked position. FIG. 6a actually shows a particular condition, prior to clamping the column, when the end faces of the lower sets of teeth on the Moving Rack and Fixed Rack are initially in line. This could have shown the end faces of the upper rows of teeth initially in line—both scenarios are possible).

Figure 6D:
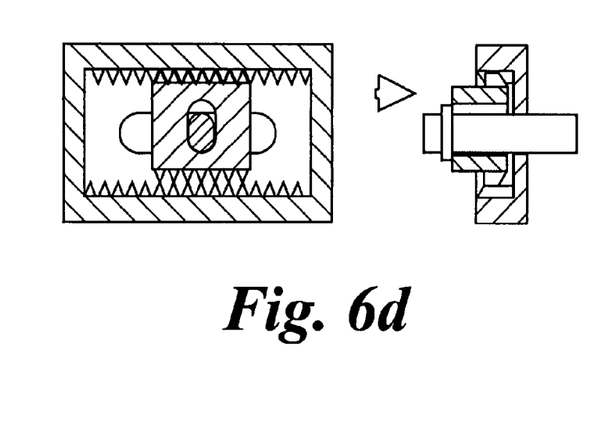

Once clamping starts by rotating the clamp lever, the teeth move towards each other until the ends of the teeth of the lower rows strike one another. Upon further movement, reaching the position shown in FIG. 6b, the bevelled end faces start to slide over one another which causes the Moving Rack to move sideways on the clamp bolt 14 (seen as a lift upwards in the drawings) as the clamping action proceeds to the stage shown in FIG. 6c. This process continues until the fully locked condition shown in FIG. 6d is reached. In this position, the teeth which initially clashed in the tooth on tooth position are now only touching at the tips. The teeth on the opposite side of the slot in the reach bracket are the ones that are engaged with their corresponding teeth on the clamp block to provide the positive locking.

Therefore, as described it is ensured that in the event that the ends of the upper moving and fixed teeth initially clash in a tooth on tooth position, the clamp block will move sideways on the pin in the opposite direction so that the lower toothed racks engage.

Figure 7A:
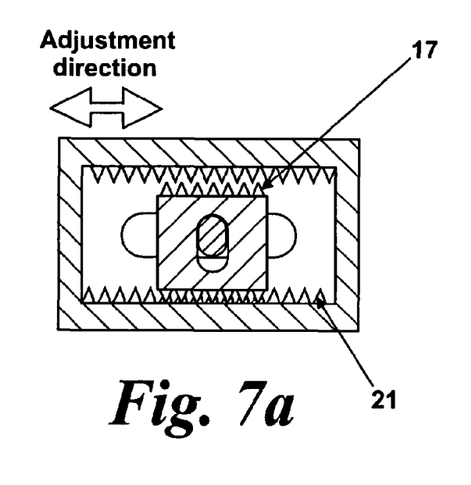
FIGS. 7a to 7d are schematics similar to those of FIG. 6 showing the fixed and moving racks in different positions as proof that tooth on tooth can always be self-removed by the apparatus during locking.
Figure 7B:
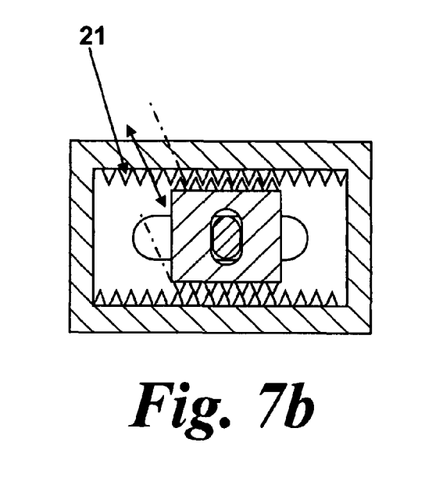
Figure 7C:
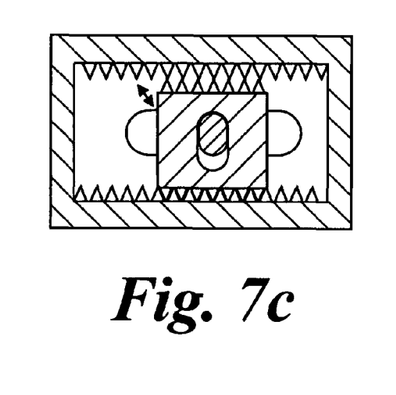
Figure 7D:
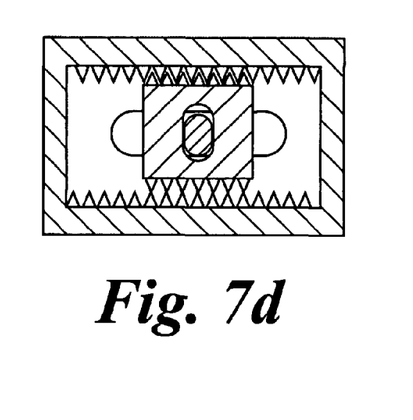

FIGS. 7a, b, c, d demonstrate that the teeth on the Fixed Rack of this embodiment are so spaced that there is no position of the Moving Rack in which the end faces of both the upper and lower rows of teeth on the Moving Rack can be simultaneously partially or wholly aligned with those of their counterparts on the Fixed Rack. Therefore it is always possible to fully engage one set of teeth, or to partially engage both sets of teeth, without blocking due to tooth-on-tooth interference.

A feature of the preferred embodiment of the invention is that locking is effected by only one pair of teeth rows at any time rather than by both pairs. It is therefore desirable to prevent, or to at least restrict, the rotational freedom of the Moving Racks 16, 17 about their respective bore axes in order to obtain correct operation of the locking system. The reach locking Moving Rack is restricted for rotation by contact between its side faces 36 and the edges 37 of the vertical slot in the Rake Bracket 12. The rake locking Moving Rack 16 is restricted for rotation by contact between its bore 38 and the rectangular portion 31 of the Clamp Bolt 14. In turn, the Clamp Bolt 14 is restrained from rotating due to: (a) a close fit of the top and lower edges of the legs 34 of the Spacer 18 within the upper and lower edges 35 of the slot in the reach locking Fixed Rack 21 and: (b) a close fit of the inside faces 33 of the legs 34 of the same Spacer 18 around the rectangular portion 31 of the Clamp Bolt 14.

Furthermore, because only one pair of teeth rows are locking at any time, the teeth may need to be designed with increased pitch and height to ensure greater strength and so avoid failure due to over-stressing in crash conditions.

Figure 8A:
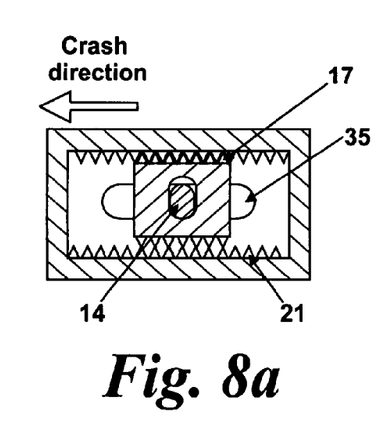
FIGS. 8a to 8f illustrate a potential failure mode of the assembly which can arise.
Figure 8B:
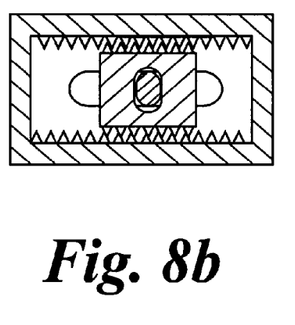
Figure 8C:
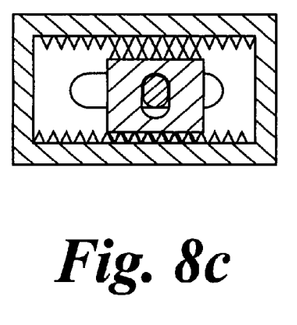
Figure 8D:
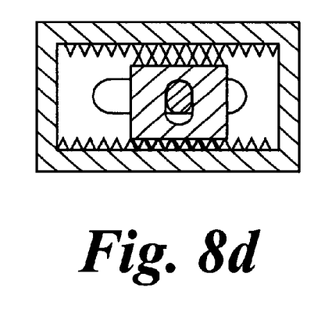
Figure 8E:
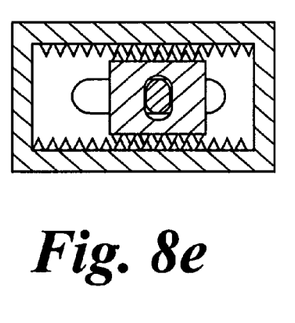
Figure 8F:
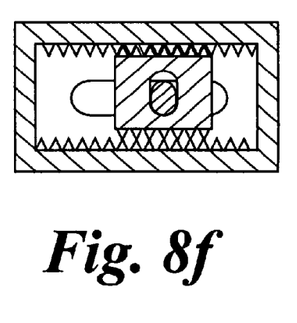
Figure 9A:
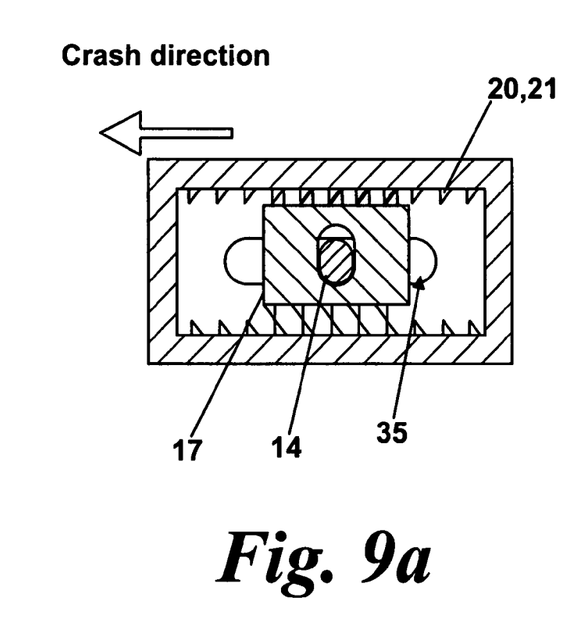
FIGS. 9a to 9c illustrate schematically a proof of concept in which the teeth of the racks have a saw tooth profile.

Consider, for example, FIG. 8a which shows the locked position which was achieved in FIG. 6d. In this particular condition, the Moving Rack is seen resting on the tips of the lower row of teeth of the Fixed Rack. If a crash situation occurs, the Fixed Rack is urged in the direction of the arrow while the Clamp Bolt is anchored horizontally. When the crash force exceeds the frictional holding force of the clamping system, the engaged sets of teeth experience a separating force that is due to the angle of the tooth sides ("flanks"), the so-called Pressure Angle. The Moving Rack may be forced downwards by this separating force (see FIG. 8b), disengaging the upper rows of teeth and causing the lower rows of teeth to become engaged instead (see FIG. 8c). At FIG. 8d, the column has slipped slightly so that the lower teeth now have to resist the crash force. However, the teeth pressure angle once again causes a tooth separating force and the mirror image of sequence FIGS. 8a, b, c ensues until the status of FIG. 8a is once again reached at FIG. 8f; except that the total cycle has resulted in the fixed rack moving, relative to the Clamp Bolt, by one whole tooth pitch. It is conceivable, then, that the cycle may repeat itself several times until the Fixed Rack has moved as far as the horizontal slot for the Clamp Bolt will allow. If the above cycle of actions takes place very rapidly, then the prime purpose of incorporating positive locking into the column will have been defeated.

It is to be noted, however, that because the tips of the teeth of each row extend in a plane that is parallel to the tips of the teeth of the other rows there is no component of the force in the direction of clamping movement. If this was present it would be highly undesirable as the crash load would generate a bursting force that will be parallel to the clamp bolt and would attempt to stretch the clamp bolt resulting in potential failure. At the very least this unwanted force would necessitate a beefed up support bracket against which the force could be reacted, which is again undesirable.

The failure mode illustrated in FIGS. 8a, b, c, d, e, f can be avoided by reducing the pressure angle on the sides of the teeth which carry the crash loads; i.e. the sides which have to resist high forces for the forward (Reach-in) and upward (Rake-up) column movements. If the tangent of the pressure angle is less than the friction coefficient acting between the teeth, then there will be no separation. In order to maintain adequate tooth thickness at their roots, and thereby ensure adequate shear strength, the pressure angle of the other sides of the teeth must be increased. Hence a so-called "Saw Tooth" profile is arrived at. In the example shown in FIG. 5a, the pressure angle of the loaded flanks is zero degrees and that of the non-loaded flanks is 45 degrees. The holding power will be much reduced for the Reach-out and Rake-down directions, effectively being little more than that provided by the friction clamping effect. However, positive locking in these directions is not important for performance in crash. Note that his compromise is present in some other existing Anti Tooth-on-Tooth designs.

Figure 9B:
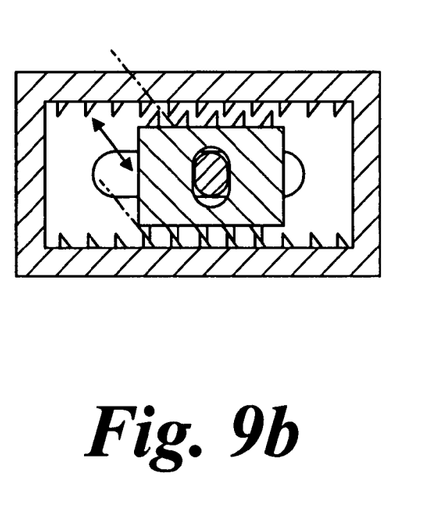
Figure 9C:
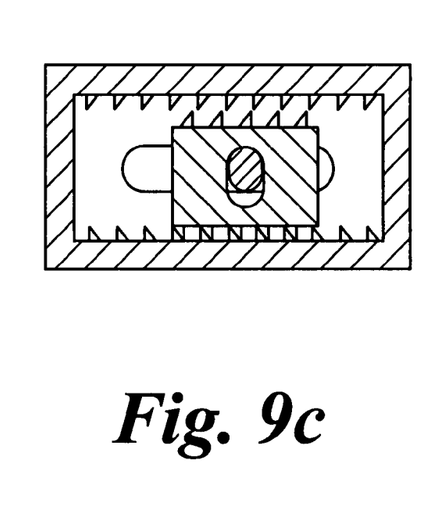

FIGS. 9a, b, c demonstrate that the saw teeth on the Fixed Rack can be so spaced that there is no position of the Moving Rack in which the end faces of the upper and lower rows of teeth on the Moving Rack can be simultaneously aligned with those of their counterparts on the Fixed Rack. Therefore it is always possible to fully engage one set of teeth, or to partially engage both sets of teeth, without blocking by tooth-on-tooth interference. However, in order to preserve this characteristic with the Saw Teeth profile, the spacing of the teeth has needed to be increased compared with that of symmetrical teeth. There are two compromises which arise from this: (a) the sets of teeth are now less strong since there are fewer teeth per set, and (b) depending on the initial Reach position, there could be up to approximately one tooth-pitch of slip in a crash before the teeth come into contact.

It is also desirable to provide load paths by which the tension in the Clamp Bolt 14 can be used to squeeze the nearer arm of the Rake Bracket 12 against the Fixed Rack—Reach 21. In the preferred embodiment, these are provided as follows. The head 30 of the Clamp Bolt 14 bears against the nearer face of the Moving Rack—Rake 16. The opposite face of the Moving Rack—Rake 16 bears against the nearer face of the Moving Rack—Reach 17 while the opposite faces of extended arms of the Moving Rack—Reach 17 bear against the adjacent surfaces of the Fixed Rack—Rake 20.

By using the Moving Racks 16 and 17 to transmit the clamp bolt tension in this way, they are sandwiched between the head 30 of the Clamp Bolt 14 and the Fixed Rack—Rake 20 and are restrained from moving normal to the clamp bolt by the friction created by the compression forces at the various contact faces. In principle, the said frictional restraint may be sufficient to prevent the problematic phenomenon illustrated by FIGS. 8a to 8f. However, whether or not this is the case will depend on the friction coefficients acting at the various contacting faces. These are hard to predict with accuracy due to the influence of material specifications, surface finishes and the presence of lubricants or contaminants. However, if a value of 10% is assumed for the friction coefficient at all the points of contact, it can be shown as follows that the above arrangement of the parts does not, by itself, prevent the problem illustrated by FIGS. 4a to 4f.

A typical value for the tension in the Clamp Bolt is 3000N. For the Reach Adjustment motion, for example, the frictional holding force will be 3000×0.1×2=600N, there being two frictional contact areas at 40, 41 (see FIG. 10) acting between the Rake Bracket and the moving upper column comprising the Upper Shroud 3, the Reach Bracket 22 and the Fixed Rack—Reach 21. If the specification requires a total holding force of 6000N in Reach, then a 6000N−600N (=5400N) force will need to be carried by the teeth of the Moving Rack—Reach 17 and the Fixed Rack—Reach 21. If, for example, the flanks of these teeth have a pressure angle of 30 degrees and a sliding coefficient of friction of 10%, it can be shown by calculation that the separating force will be 0.477× the holding force acting on the teeth. I.e. the separating force, in this case, is 0.477×5400N=2577N. However, the frictional force restraining the Moving Rack—Reach from moving normal to the clamp bolt is 3000×0.1×2=600N, it being clamped between two faces by the bolt tension. This is much less than the separating force and is therefore insufficient to prevent the problem illustrated by FIGS. 8a to 8f.

It can be shown by calculation that a minimum friction coefficient of 25% is needed to restrain the Moving Rack—Reach against separating using the above means, and that a minimum friction coefficient of 33% is needed to similarly restrain the Moving Rack—Rake. Note that the Rake case is different from the Reach case because of the lever arm effect of the different steering wheel clamp bolt positions, relative the Rake Pivot axis, means that the force seen at the clamp bolt is approximately 2× the Rake holding force which is specified at the wheel.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An adjustable steering column assembly which includes a first portion, a second portion and a clamp mechanism that comprises a fixed rack secured to the first portion and a moving rack secured to the second portion, the first and second portions being releasably engaged by the clamp mechanism to selectively permit an amount of relative movement between the first and second portions that is required during at least one of reach and rake adjustment of the steering column assembly, in which:

the fixed rack comprises two rows of teeth which are arranged spaced apart from one another with the teeth extending towards each other such that tips of the teeth of one row lie in a plane which is parallel to a plane containing the tips of the teeth of the other row, the moving rack comprises two rows of teeth which extend away from each other in opposite directions and are spaced apart from each other by an amount less than the spacing between the two rows of teeth of the fixed rack such that tips of the teeth of one row of the moving rack lie in a plane which is parallel to a plane containing the tips of the teeth of the other row of the moving rack, wherein one of the two rows of teeth of one of the fixed rack and the moving rack are axially offset relative to the other one of the two rows of teeth thereof and the tips of the teeth of the fixed rack and the moving rack face each other, and in which the clamp mechanism further comprises a clamp engaging means which is operable to move the moving rack into and out of engagement with the fixed rack such that:

in a disengaged position of the clamp mechanism the rows of teeth on the moving rack are held clear of the rows of teeth of the fixed rack, and in an engaged position one row of teeth of the moving rack is interlocked with a row of teeth of the fixed rack, such interlocking in the engaged position being assured by arranging that the teeth on the fixed rack and the moving rack are aligned relative to one another such that in the event that end faces of the teeth of one of the rows on the fixed rack are aligned in a tooth on tooth position with end faces of the teeth of one of the rows of the moving rack, the teeth of the other row on the fixed rack will not be aligned in a tooth on tooth position with the teeth of the other row on the moving rack due to the one of the two rows of teeth of one of fixed rack and the moving rack being axially offset relative to the other one of the two rows of teeth thereof and further by the clamp mechanism being so constructed and arranged that when this tooth on tooth event occurs or the moving rack is moving towards a tooth on tooth event on moving from the disengaged to the engaged position then during continued movement the fixed rack interacts with the moving rack to cause the moving rack to move across in the direction of the rows of teeth that are not aligned in a tooth on tooth position thereby to cause those rows of teeth to become inter-engaged when the mechanism finally reaches the locked position.

2. The adjustable steering column assembly according to claim 1 wherein at least two ramps are provided on the fixed rack, each one associated with a respective one row of teeth of the fixed rack, and at least two complimentary ramps are provided on the moving rack, each one associated with a respective one row of the teeth of the moving rack such that in the event that a tooth on tooth event occurs one ramp on the fixed rack co-operates with one ramp on the moving rack whereby the action of the ramps sliding over one another on movement towards the locked position causes the movement of the moving rack across in the direction of the rows of teeth that are not in tooth on tooth.

3. The adjustable steering column assembly according to claim 2 wherein the end faces of the teeth of at least one of the fixed rack and the moving rack define the ramps.

4. The adjustable steering column assembly according to claim 1 wherein each of the fixed rack rows of teeth lie in a common plane, and the moving rack rows of teeth also lie in a common plane, the planes being parallel to one another.

5. The adjustable steering column assembly according to claim 4 wherein the planes are coincident when the clamping mechanism is in the engaged position.

6. The adjustable steering column assembly according to claim 1 wherein the movement of the moving rack from side to side is along an axis which is one of parallel to, or lies within, the plane that contains the two moving rack rows of teeth.

7. The adjustable steering column assembly according to claim 1 wherein the teeth of the rows of teeth of at least one of the moving and fixed racks all have the same pitch.

8. The adjustable steering column assembly according to claim 1 wherein the teeth are offset axially along a direction parallel to the long axis of the rows from the teeth of the other rows.

9. The adjustable steering column assembly according to claim 8 wherein the teeth are offset by half of the pitch between the teeth of that row.

10. The adjustable steering column assembly according to claim 1 wherein the spacing between the two rows of teeth on the moving rack is such that when the teeth of one of the moving rack rows and the teeth of a corresponding one of the fixed rack row are fully engaged, the teeth of the remaining rows are fully disengaged.

11. The adjustable steering column assembly according to claim 10 wherein the spacing is such that when the tips of the teeth of one of the fixed rack row pair and the moving rack row pair are in contact the teeth of the other one of the fixed rack row pair and the moving rack row pair are fully engaged.

12. The adjustable steering column assembly according to claim 1 wherein the moving rack comprises a clamp block which includes an elongate slot through which a clamp bolt is passed, the clamp bolt also passing through an elongate slot in the fixed rack, the slot in the clamp block being elongated in a direction 90 degrees from the direction in which the slot in the fixed rack extends.

13. The adjustable steering column assembly according to claim 1 wherein the teeth comprise saw shape teeth.

14. The adjustable steering column assembly according to claim 1 wherein the first portion comprises an upper tubular shroud which can move telescopically relative to a lower tubular shroud, the clamp mechanism selectively locking the upper and lower shrouds together to control reach adjustment.

15. The adjustable steering column assembly according to claim 14 wherein the second portion comprises the lower tubular shroud and a third portion is provided which comprises a support bracket, the clamp mechanism simultaneously clamping the first, second and third portions together.

16. The adjustable steering column assembly according to claim 15 wherein two fixed racks and two moving racks are provided, one of the fixed racks and moving racks providing positive locking of the first and second portions of the steering assembly and the other one of the fixed rack and moving rack providing positive locking of the first portion to the third portion of the steering assembly.

17. The adjustable steering column assembly according to claim 16 wherein the teeth on the two moving racks are arranged at approximately 90 degrees to one another.

* * * * *